(12) United States Patent
O'Keeffe et al.

(10) Patent No.: US 11,495,927 B2
(45) Date of Patent: Nov. 8, 2022

(54) PORTABLE RADIO SYSTEM

(71) Applicant: Tait International Limited, Christchurch (NZ)

(72) Inventors: Cameron Patrick Greig O'Keeffe, Christchurch (NZ); Justin Allan Standring, Christchurch (NZ); Simon Edward Pollard, Christchurch (NZ); Sasha Wang, Christchurch (NZ); Reece Boyd Browne, Christchurch (NZ)

(73) Assignee: Tait International Limited, Christchurch (NZ)

( * ) Notice: Subject to any disclaimer, the term of this patent is extended or adjusted under 35 U.S.C. 154(b) by 0 days.

(21) Appl. No.: 17/104,519

(22) Filed: Nov. 25, 2020

(65) Prior Publication Data

US 2021/0159649 A1 May 27, 2021

Related U.S. Application Data

(60) Provisional application No. 62/940,149, filed on Nov. 25, 2019.

(51) Int. Cl.
*H01R 27/00* (2006.01)
*H01R 29/00* (2006.01)
*H01R 13/73* (2006.01)
*H01R 24/28* (2011.01)
*H04B 1/3827* (2015.01)
(Continued)

(52) U.S. Cl.
CPC ............. *H01R 29/00* (2013.01); *H01R 13/73* (2013.01); *H01R 24/28* (2013.01); *H01R 27/00* (2013.01); *H04B 1/3833* (2013.01); *H01R 13/5219* (2013.01); *H01R 13/621* (2013.01); *H01R 2107/00* (2013.01); *H01R 2201/04* (2013.01)

(58) Field of Classification Search
CPC .. H01R 13/5219; H01R 13/621; H01R 13/73; H01R 24/28; H01R 27/00; H01R 29/00; H01R 2107/00; H01R 2201/04; H04B 1/3833
USPC ........................................................ 439/218
See application file for complete search history.

(56) References Cited

U.S. PATENT DOCUMENTS 3,345,568 A * 10/1967 Errichiello ........... H04B 1/3833
455/90.3
4,792,986 A * 12/1988 Garner ..................... H04B 1/02
455/68
(Continued)

*Primary Examiner* — Abdullah A Riyami
*Assistant Examiner* — Vladimir Imas
(74) *Attorney, Agent, or Firm* — Run8 Patent Group, LLC; Peter Miller; Leah Raddatz

(57) ABSTRACT

One variation of a portable radio system includes: a portable radio configured to transmit and receive audio communication, including a connector receptacle arranged on a rear face of the portable radio and a channel extending from the connector receptacle; a cable, configured to couple the portable radio to a secondary device, including a straight section configured to seat within the channel and defining a length greater than a length of the channel; a connector, coupled to the straight section of the cable, configured to seat within the connector receptacle to couple the cable to the portable radio in an upward and downward orientation; and a clip including a base section configured to transiently couple to the body over the connector and a clamp section configured to pivot relative the base section and to attach the portable radio to a user.

19 Claims, 6 Drawing Sheets

(51) Int. Cl.
*H01R 13/621* (2006.01)
*H01R 107/00* (2006.01)
*H01R 13/52* (2006.01)

(56) References Cited

U.S. PATENT DOCUMENTS

| | | | | |
|---|---|---|---|---|
| 5,038,400 A * | 8/1991 | Baracat | ................ | H04B 1/3877 |
| | | | | 455/90.3 |
| 5,526,526 A * | 6/1996 | Clark | ........................ | G01S 1/68 |
| | | | | 455/100 |
| 5,630,211 A * | 5/1997 | Nagai | .................. | H04B 1/3833 |
| | | | | 455/349 |
| 5,819,163 A * | 10/1998 | Tsukamoto | ......... | H04M 1/0214 |
| | | | | 455/575.1 |
| 5,854,970 A * | 12/1998 | Kivela | ................. | H04B 1/3833 |
| | | | | 343/702 |
| 6,026,282 A * | 2/2000 | Garcia | ................ | H04M 1/6075 |
| | | | | 455/575.6 |
| 6,390,845 B1 * | 5/2002 | Brady | .................. | H01R 13/621 |
| | | | | 439/372 |
| 7,442,060 B2 * | 10/2008 | Suwalski | ............ | H01R 13/6275 |
| | | | | 439/350 |
| 7,581,970 B2 * | 9/2009 | Englund | ............... | H01R 13/645 |
| | | | | 439/171 |
| 7,965,244 B2 * | 6/2011 | Nawa | ...................... | H01Q 1/243 |
| | | | | 343/702 |
| 8,177,576 B2 * | 5/2012 | Zhou | .................... | H01R 13/512 |
| | | | | 439/372 |
| 9,300,086 B1 * | 3/2016 | Qu | ...................... | H01R 13/6335 |
| 10,592,042 B1 * | 3/2020 | Lee | ...................... | G06F 1/1628 |
| 10,615,836 B1 * | 4/2020 | Akens | .................. | H04B 1/3833 |
| 11,050,189 B1 * | 6/2021 | Garcia | ............... | H01R 13/6215 |
| 2019/0379418 A1 * | 12/2019 | Lee | ...................... | H04B 1/3833 |

* cited by examiner

PORTABLE RADIO SYSTEM

CROSS-REFERENCE TO RELATED APPLICATIONS

This application claims the benefit of U.S. Provisional Application No. 62/940,149, filed on 25 Nov. 2019, which is incorporated in its entirety by this reference.

TECHNICAL FIELD

This invention relates generally to the field of radio communications and more specifically to a new and useful portable radio connection system in the field of radio communications.

DESCRIPTION OF THE EMBODIMENTS

Figures 1A, 1B:
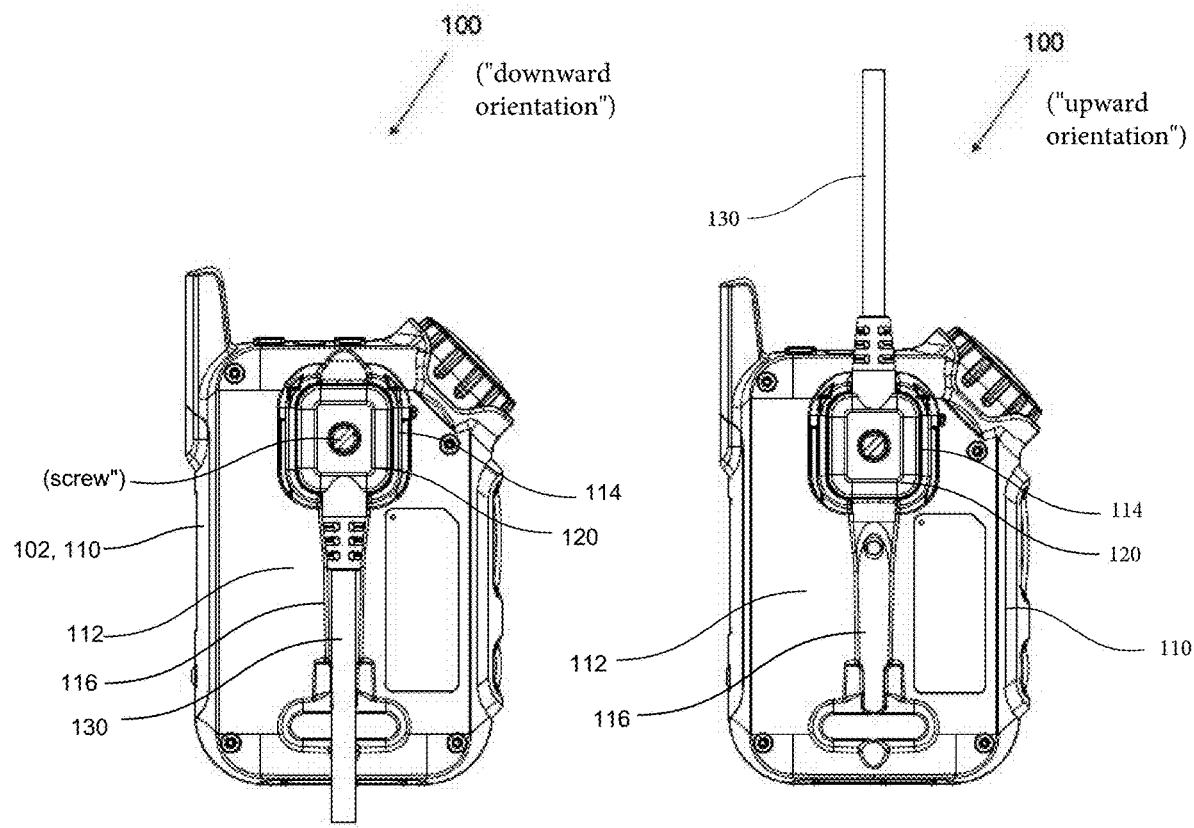
FIGS. 1A and 1B are schematic representations of a portable radio system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Portable Radio System

As shown in FIGS. 1A-4C, a portable radio system 100 includes a portable radio 102 including: a wireless communication module configured to transmit and receive audio communications; and a body 110 including a connector receptacle 114 arranged on a rear face 112 of the body 110 and defining a channel 116 extending from the connector receptacle 114 along the rear face 112. The portable radio system 100 further includes: a cable 130 including a first section configured to transiently seat within the channel 116 and a second section extending from the first section to a secondary device; and a connector 120, coupled to the first section of the cable 130 opposite the second section, configured to transiently seat within the connector receptacle 114 to electronically couple the cable 130 to the portable radio 102 and operable in a downward orientation and an upward orientation. The portable radio system 100 further includes a clip 140 including: a base section 142 configured to transiently couple to the portable radio 102 over the connector receptacle 114 and the connector 120; a discrete pivot located within a threshold distance of a center of the connector receptacle 114; and a clamp section 144 pivotably coupled to the base section at the discrete pivot and configured to attach the portable radio to a clothing surface.

In one variation, as shown in FIGS. 1A-4C, the portable radio system 100 includes a portable radio 102: configured to transmit and receive audio communication; including a connector receptacle 114 arranged on a rear face 112 of the portable radio 102; and defining a channel 116 extending from the connector receptacle 114 along the rear face 112. In this variation, the portable radio system 100 further includes a cable 130 configured to electronically couple the portable radio 102 to a secondary device and including: a first section 132 configured to transiently seat within the channel 116 and defining a first length greater than a second length of the channel 116; and a second section 134 extending from the first section to the secondary device. The portable radio system 100 further includes a connector 120: coupled to the first section 132 of the cable 130 opposite the second section 134; configured to transiently seat within the connector receptacle 114, with the first section of the cable 130 transiently retained in the channel 116 and with the second section of the cable 130 extending downwardly from a bottom of the portable radio 102, to electronically couple the cable 130 to the portable radio 102 in a downward orientation; and configured to transiently seat within the connector receptacle 114, with the first section of the cable 130 extending upwardly from a top of the portable radio 102, to electronically couple the cable 130 to the portable radio 102 in an upward orientation. The portable radio system 100 further includes a clip 140 including: a base section 142 configured to transiently couple to the portable radio 102 over the connector receptacle 114 and the connector 120; and a clamp section 144 configured to pivot relative the base section 142 and to attach the portable radio 102 to a user.

Figure 2:
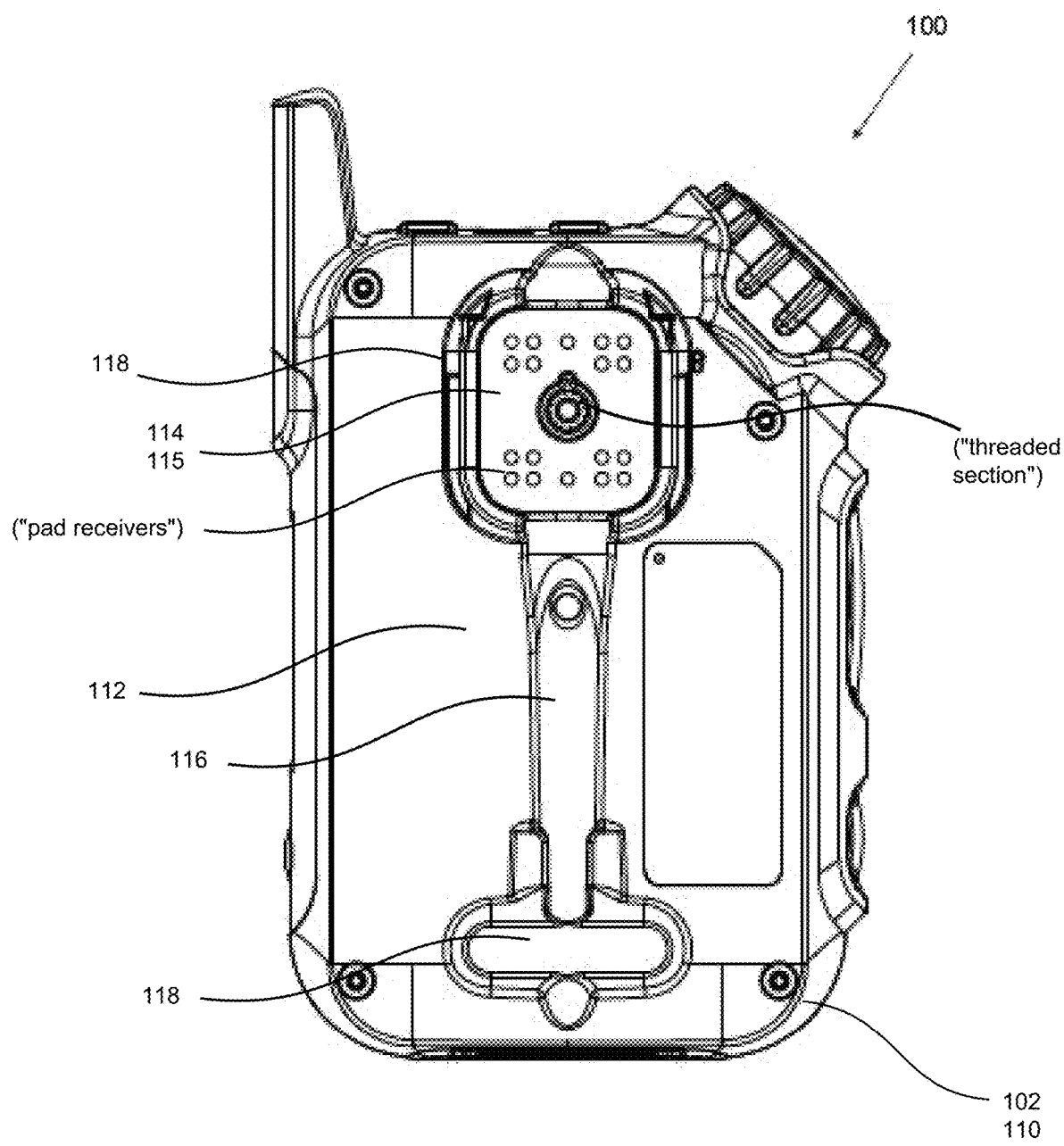
FIG. 2 is a schematic representation of the portable radio system.
Figures 3A, 3B:
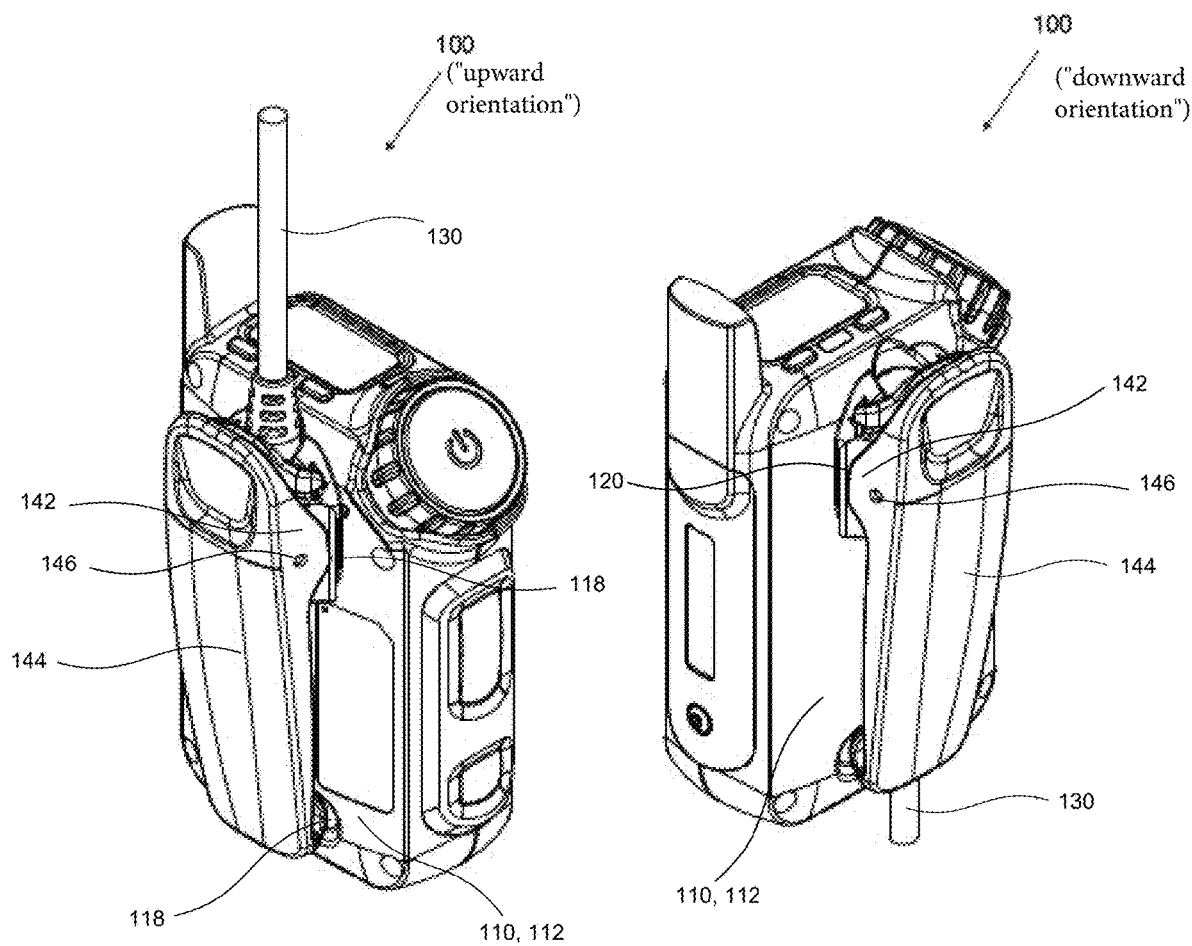
FIGS. 3A and 3B are schematic representations of the portable radio system.
Figure 4A:
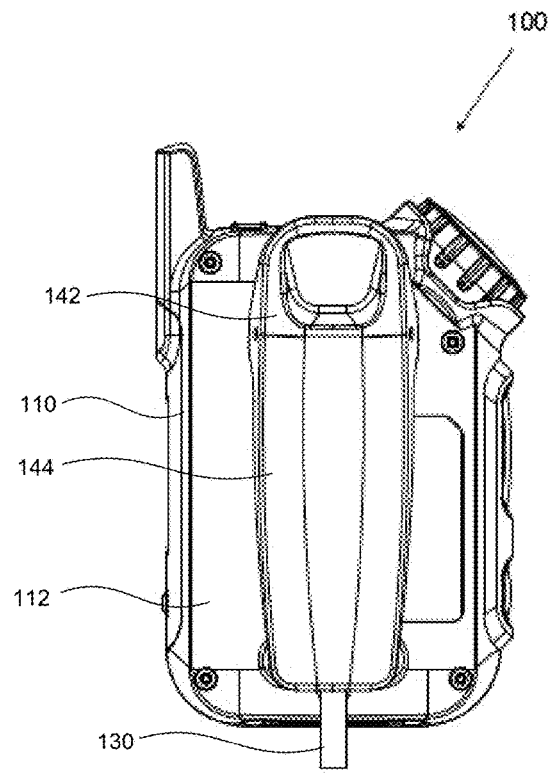
FIGS. 4A, 4B, and 4C are schematic representations of the portable radio system.
Figure 4B:
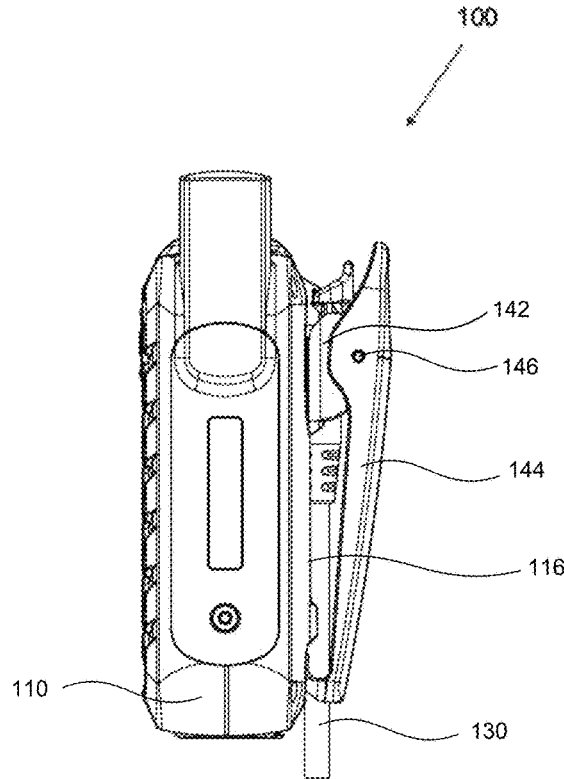
Figure 4C:
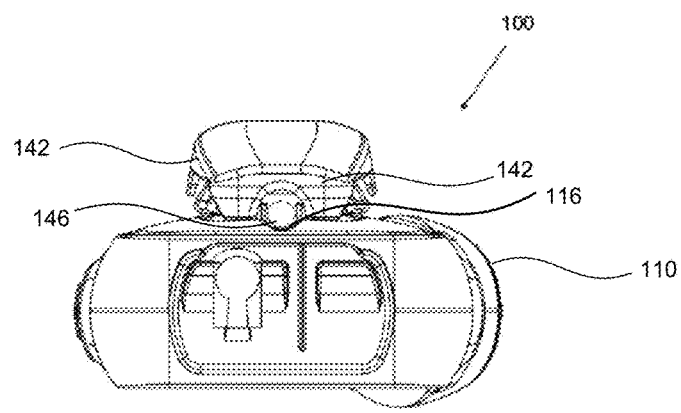

In one variation, as shown in FIG. 2, the portable radio system 100 includes a portable radio 102 including a wireless communication module configured to transmit and receive audio communications and a body 110: including a connector receptacle 114 arranged on a rear face 112 of the body 110 and configured to transiently receive a connector 120 to electrically couple the portable radio 102 to a secondary device; defining a channel 116 extending from the connector receptacle 114 along the rear face 112 and configured to transiently receive a cable 130 extending from the connector 120 to the secondary device; and including a set of clip retention features 118 adjacent the connector receptacle 114. In this variation, the portable radio system 100 further includes a clip 140 including: a base section 142 configured to transiently install on the rear face 112 of the body 110, over the connector receptacle 114, via the set of clip retention features 118; a pivot section 146 located within a threshold distance of a center of the connector receptacle 114; and a clamp section 144 configured to pivot relative the base section 142 at the pivot section 146 from a closed position to an open position to attach the portable radio 102 to a surface.

2. Applications

Generally, the portable radio system 100 includes: a portable radio 102; a connector 120 coupled to a cable 130 configured to electronically couple the portable radio 102 to a secondary device; and a clip 140 configured to couple to the portable radio 102 to enable secure attachment of the portable radio 102 to an article of clothing worn by a user. In particular, the portable radio 102 can include a body 110 (e.g., a casing) defining: a connector receptacle 114 integrated into a rear face 112 of the body 110 and configured to accept and retain the connector 120; and a channel 116 extending outward from the connector receptacle 114 along the rear face 112 and configured to accept and retain a first section of the cable 130. The clip 140 can be configured to couple to the rear face 112 of the body 110 over the connector receptacle 114 and the channel 116, such that the connector 120 and the first section of the cable 130 are covered by the clip 140 when coupled to the portable radio 102.

The portable radio 102 can include a cellular transceiver and a local area networking transceiver that support full-duplex, digital transmission of audio communications with other secondary devices (e.g., other portable radio 102s). The portable radio 102 can also be configured to send and receive digital messages (e.g., MMS, SMS) and enable Bluetooth and Wi-Fi connectivity. However, while the portable radio 102 can transmit and receive electrical signals (e.g., digital electrical signals) to other secondary devices, not all secondary devices may be compatible with a format of these electrical signals transmitted by the portable radio 102. Therefore, the portable radio 102 can be configured to receive a connector 120 configured to convert these electrical signals between different formats to enable electronic communication between the portable radio 102 and a secondary device.

The connector 120 can include a signal converter (e.g., a processor, a controller, an electrical circuit) configured to transform electrical signals received from the portable radio 102 into corresponding electrical signals readable by the secondary device. Similarly, the signal converter can be configured to transform electrical signals received from the secondary device into corresponding electrical signals readable by the portable radio 102. For example, the portable radio system 100 can include: a portable radio 102 configured to send and receive digital messages; and a connector 120 coupled to the portable radio 102 and including a signal converter configured to receive and transmit electrical signals between the portable radio 102 and a legacy analog radio (i.e., a secondary device) electronically coupled to the connector 120 via a cable 130 extending between the portable radio 102 and the legacy analog radio. The connector 120 can include a signal converter configured to: receive a digital signal from the portable radio 102; convert the digital signal to a corresponding analog signal; and route the corresponding analog signal through the cable 130 to the legacy analog radio. Therefore, in this example, the signal converter can be configured to enable digital-to-analog signal conversion. Additionally and/or alternatively, the signal converter can be configured to enable: analog-to-digital signal conversion; digital-to-digital signal conversion; and/or analog-to-analog signal conversion.

The connector 120 and the cable 130 can be configured to couple to the portable radio 102 in both a downward orientation and an upward orientation while maintaining identical functioning of the signal converter within the connector 120. In the downward orientation, the cable 130 can be routed within the channel 116 extending downward from the connector receptacle 114. Alternatively, in the upward orientation, the cable 130 can be routed upward from the connector receptacle 114. A user may insert the connector 120 within the connector receptacle 114 in either the upward or downward orientation based on her preference.

Figures 5A, 5B:
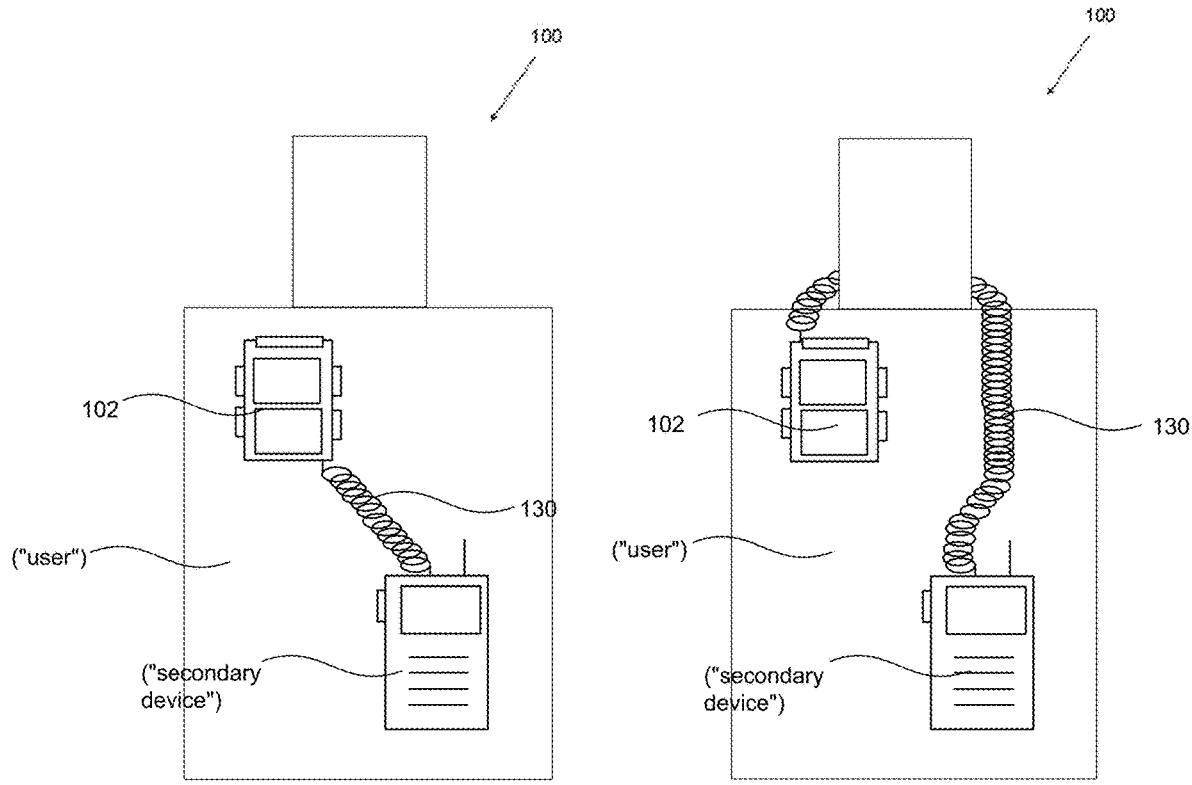
FIGS. 5A and 5B are schematic representations of the portable radio system.

In one example, as shown in FIGS. 5A and 5B, a user may fasten (e.g., via the clip 140) the portable radio 102 to a pocket on her shirt. To couple the portable radio 102 to a secondary device (e.g., a legacy analog radio) fastened to her belt, she may route the cable 130 and the connector 120—coupled to an end of the cable 130 opposite the secondary device—from the secondary device toward the connector receptacle 114. The user may route the cable 130 upward and across her abdomen toward the portable radio 102 or upward, around a back of her neck, and back down toward the portable radio 102 attached to her pocket. Depending on her preference, the user may insert the connector 120 into the connector receptacle 114 in the downward orientation if she wishes to wear the cable 130 across her abdomen, or, she may insert the connector 120 into the connector receptacle 114 in the upward orientation if she wishes to wear the cable 130 around the back of her neck.

The clip 140 can be configured to attach the portable radio 102 to a surface (e.g., a clothing surface) of the user. The clip 140 can also support retention of the connector 120 within the connector receptacle 114 and the cable 130 within the channel 116. In particular, the clip 140 can be configured to seat over the connector 120 inserted into the connector receptacle 114 and the cable 130 seated in the channel 116. In particular, the clip 140 can include a base section configured to mount over the connector 120 in the connector receptacle 114 to both couple the clip 140 to the portable radio 102 and to shield the connector 120. The clip 140 can also define a relief configured to seat over the cable 130 in the channel 116 extending from the connector receptacle 114, such that cable 130 does not hinder closing of the clip 140 on the rear face 112 of the body 110 and that the cable 130 is shielded by the clip 140.

By locating the clip 140 over the connector 120 in the connector receptacle 114 and the cable 130 in the channel 116, the clip 140 can stabilize an orientation of the portable radio 102 relative the surface to which the clip 140 is attached. In particular, locating the base section 142 of the clip 140 over the connector receptacle 114 minimizes a lever distance between connection of the cable 130 and the clip 140. Due to this minimal lever distance, each large force (i.e., tension) on the cable 130 (e.g., due to movements by the user) produces a relatively small torque on the base section 142 of the clip 140 and thus results in minimum rotation of the clip 140 on the surface. Therefore, the portable radio 102 can remain in a stable temporary position against the surface (e.g., a belt, a lapel)—even with a low clamp force of the clip 140 against the body 110 of the portable radio 102. Thus, the clip 140 can include a weaker spring (i.e., a discrete pivot) or a thinner living hinge—which may be easier or more comfortable for the user to operate—and still limit movement of the portable radio 102 against the surface.

Additionally and/or alternatively, the clip 140, the connector 120, and the body 110 of the portable radio 102 can cooperate to semi-rigidly locate the first section of the cable 130—seated in the channel 116—adjacent the body 110. Therefore, by semi-rigidly locating the first section of the cable 130 against the body 110, interference by the cable 130, such as when the user attaches the portable radio 102 to a surface via the clip 140, can be limited. Similarly, while the user wears the portable radio 102, entanglement of the cable 130 can be minimized. Additionally and/or alternatively, the cable 130 can define a rubberized surface that can mate with an adjacent surface (e.g., a pant, a shirt worn by the user) to further retain the portable radio 102 in a consistent position on the surface.

3 Portable Radio

The portable radio system 100 includes a portable radio 102 including: a body 110 (e.g., a plastic body 110); and a wireless communication module housed within the body 110 and configured to transmit and receive audio communications.

In one implementation, the portable radio 102 includes: a cellular transceiver and a local area networking transceiver that support full-duplex, digital transmission of audio communications with other devices (e.g., other portable radio 102S within the network, a dispatcher); a geospatial position sensor configured to detect the geospatial location of the portable radio 102; an audio output, such as in the form of an integrated speaker, an audio output jack, and/or a short-range wireless audio transmitter; a volume control, such as in the form of a knob or buttons; a microphone (or other sensor); a local memory; and a signal converter configured to execute Blocks of the method S100. The portable radio 102 can also include a display configured to render visual prompts for the user, graphical user interfaces (hereinafter "GUI") for the user, and/or a haptic module configured to output haptic prompts (e.g., vibrations) to the user, such as to notify the user of a change in button configuration. Thus, in this implementation, the portable radio 102 can receive audio communications in digital format over the cellular transceiver and/or over the local area network transceiver and can output these audio communications via the integrated speaker or over a connected device.

In one variation, the portable radio 102 also includes a land portable radio 102 transceiver configured to support half-duplex person-to-person voice communications over a radio channel 116, such as within a VHF or UHF band. For example, radio base stations (e.g., repeaters)—such as including towers and antennas—can be installed within a building, throughout a campus, or within a geographic region to form a private land portable network that supports low-bandwidth half-duplex communications between radio devices. Thus, in this implementation, the portable radio 102 can: receive audio communications in digital format (via the cellular transceiver and/or over the local area networking transceiver) and/or in analog format (via the land portable radio 102 transceiver); and output these audio communications via the integrated speaker or over a connected device.

Alternatively, the portable radio 102 can include an input audio jack configured to connect to a legacy land portable radio device (hereinafter a "land portable radio device"). In this implementation, the land portable radio device can: receive audio communication in analog format over a land portable radio 102 network and output these audio communications via its integrated speaker. Likewise, the portable radio 102 can transmit audio signals recorded by an integrated microphone of the portable radio 102 to the land portable radio device for analog transmission to other land portable radio devices.

Therefore, the portable radio 102 can include various communication functionalities: cellular communication technologies (e.g., to enable cellular communications between portable radio 102S over one or multiple cellular networks); wireless data communication technologies (e.g., to send and receive, text, audio, video, and controls data over IEEE 802.11 protocols); and/or full-duplex radio communication technologies. Additionally, the portable radio 102 can also operate near-field communication (hereinafter "NFC") technology to share button configuration data or other data across short distances. Additionally or alternatively, the portable radio 102 can be connected to a portable computing device, such as a smartphone, tablet, or other portable computing device to access various functionality integrated into the portable computing device, such as location services, cellular connectivity, and a digital display.

4. Body

The portable radio 102 includes a body 110 (i.e., a housing) configured to accept and retain the connector 120 and the cable 130 for electronically coupling the portable radio 102 to a secondary device (e.g., a legacy analog radio, a handheld microphone). Generally, the body 110 defines: a connector receptacle 114 integrated into the body 110 and configured to transiently retain the connector 120; and a channel 116 integrated into the body 110 and configured to transiently retain the cable 130.

In particular, the body 110 can be configured to accept and retain the connector 120 within the connector receptacle 114 integrated into a rear face 112 of the body 110. The body 110 can also be configured to accept and retain the cable 130—coupled to the connector 120—within the channel 116 extending along the rear face 112 of the body 110, the channel 116 intersecting the connector receptacle 114.

The body 110 can be configured to house the wireless communication module of the portable radio 102 and/or other electronic components of the portable radio 102. Further, the body 110 can include a set of cutouts configured to house a set of user interfaces (e.g., a power button, a speaker button, a volume dial, a digital screen) configured to receive inputs from a user.

4.1 Connector Receptacle

The body 110 of the portable radio 102 can include a connector receptacle 114 integrated into the rear face 112 of the body 110. The connector receptacle 114 can be configured to accept and retain the connector 120 coupled to the cable 130.

The connector receptacle 114 defines a base surface 115 configured to mate with an inner surface of the connector 120. To enable insertion of the connector 120 into the connector receptacle 114 and mating of the inner surface of the connector 120 with the base surface 115 of the connector receptacle 114, the base surface 115 can define: a width exceeding a width of the inner surface of the connector 120; and a length exceeding a length of the inner surface. Therefore, the base surface 115 of the connector receptacle 114 can define an area greater than an area of the inner surface of the connector 120, thus enabling the inner surface to seat approximately flush with the base surface 115 when the connector 120 is inserted into the connector receptacle 114.

In one implementation the connector receptacle 114 can define a depth approximately equivalent (e.g., within two millimeters) a height of the connector 120, such that walls of the connector receptacle 114 cover and/or protect the connector 120 when inserted into the connector receptacle 114.

In one implementation, the connector receptacle 114 defines a rectangular shape with rounded edges configured to accept a corresponding rectangular connector 120 with rounded edges. However, the connector receptacle 114 can define any shape matched to a shape of the connector 120 such that connector 120 seats within the connector receptacle 114 with the inner surface of the connector 120 approximately flush the base surface 115 of the connector receptacle 114.

In one implementation, the body 110 can include the connector receptacle 114 arranged in a first region of the rear face 112 of the body 110 proximal a center of the rear face 112. By locating the connector receptacle 114 proximal the center of the body 110—and therefore proximal a center of gravity of the body 110—the portable radio 102 can couple to a connector 120 and cable 130 at this center of gravity and therefore exhibit limited torque on the connector 120 and the cable 130, thus enabling the portable radio 102 to remain connected to the connector 120 and the cable 130, and thereby, remain electronically coupled with a secondary device (e.g., a legacy analog radio) coupled to an end of the cable 130 opposite the connector 120.

4.1.1 Clip Retention Features

In one variation, the connector receptacle 114 can include a set of clip retention features 118 configured to retain the connector 120 within the connector receptacle 114.

In one implementation, the connector receptacle 114 can include a first set of clip retention features configured to couple with a second set of retention of features on the connector 120 to retain the connector 120 within the connector receptacle 114. For example, the connector receptacle 114 can include a threaded section integrated into a base surface 115—inset and approximately parallel the rear face 112 of the body 110—of the connector receptacle 114. The threaded section can be configured to mate with a screw extending from an inner surface of the connector 120 facing the base surface 115 when the connector 120 is inserted into the connector receptacle 114. In this example, a user may seat the connector 120 within the connector receptacle 114 and tighten the screw to insert the screw into the threaded section to retain the connector 120 within the connector receptacle 114. To remove the connector 120 from the connector receptacle 114, the user may loosen the screw to retract the screw from the threaded section, thereby enabling the user to easily lift the connector 120 from the connector receptacle 114.

In another implementation, the connector receptacle 114 can include a set of latch features configured to open and close to enable insertion and removal of the connector 120 from the connector receptacle 114. For example, the connector receptacle 114 can include: a first latch feature arranged adjacent a first wall of the connector receptacle 114 (e.g., perpendicular the base surface 115 of the connector receptacle 114); and a second latch feature arranged adjacent a second wall of the connector receptacle 114 opposite the first wall. These first and second latch features can be configured to extend outward from each wall, approximately flush with the rear face 112 of the body 110. In this example, when the user wishes to insert the connector 120 into the connector receptacle 114, the user may push the connector 120 downward into the connector receptacle 114 such that connector 120 forces the first and second latch features of the connector receptacle 114 to retract downward (e.g., perpendicular the base surface 115 of the connector receptacle 114). Once the connector 120 is fully inserted into the connector receptacle 114 by the user, the first and second latch feature can release upward to again rest approximately parallel and flush the rear face 112 of the body 110, seating over the outer surface of the connector 120. In this position, the first and second latch features can prevent the connector 120 from falling out of the connector receptacle 114 (e.g., when the portable radio 102 is worn by the user). However, when the user wishes to remove the connector 120 from the connector receptacle 114, she may pull outward on the connector 120 to force the first and second latch upward, thereby enabling removal of the connector 120. Therefore, these latch features can be configured to open and close only when a force applied to the latch features exceeds a threshold force, thus enabling the user to control insertion and removal of the connector 120 from the connector receptacle 114 while preventing accidental removal of the connector 120 from the connector receptacle 114.

In one implementation, the connector receptacle 114 can include a seal lining surfaces of the connector receptacle 114 configured to prevent slippage of the connector 120 within and/or out of the connector receptacle 114. The seal can be configured to abut surfaces of the connector 120 to surfaces of the connector receptacle 114 in order to stabilize the connector 120 within the connector receptacle 114. Further, the seal can prevent wear and tear on the connector 120 and the body 110 by limiting movement (e.g., rattle) of the connector 120 within the connector receptacle 114 and limiting grinding of the connector 120 and body 110 against one another when the connector 120 is inserted into the connector receptacle 114. For example, the connector receptacle 114 can include a rubber seal lining the base surface 115 and outer walls of the connector receptacle 114. In another example, in which the connector receptacle 114 includes a threaded section configured to mate with a screw of the connector 120, the connector receptacle 114 can include an O-ring arranged about the threaded section (e.g., against the base surface 115 of the connector receptacle 114) such that when the connecter is inserted into the connector receptacle 114 and the screw is mated with the threaded section, the O-ring abuts the inner surface of the connector 120 to the base surface 115 of the connector receptacle 114.

4.2 Channel

The body 110 can define a channel 116 (or "channel 116") extending from the connector receptacle 114 along the rear face 112 of the body 110. The channel 116 can be configured to accept and retain a cable 130 configured to couple the portable radio 102 to the secondary device. In particular, body 110 can include both the connector receptacle 114 and the channel 116 extending along the rear face 112 of the body 110 and intersecting the connector receptacle 114, such that the connector receptacle 114 can retain the connector 120 and the channel 116 can retain the cable 130 simultaneously, the connector 120 coupled to an end of the cable 130.

In one implementation, the body 110 defines a channel 116 extending vertically downward from the connector receptacle 114 along the rear face 112 of the body 110. For example, the body 110 can define a channel 116 extending downward from the connector receptacle 114 (e.g., along a length of the body 110) toward a bottom edge of the rear face 112 of the body 110. The cable 130 can be seated within the channel 116 to enable insertion of the connector 120 into the connector receptacle 114 in the downward orientation. Further, by seating the cable 130 within the channel 116, movement of the cable 130 relative the body 110 is constrained, thereby constraining movement (e.g., rotation) of the connector 120 relative the connector receptacle 114. Additionally, in this implementation, the body 110 can define a groove extending vertically upward from the connector receptacle 114 (e.g., opposite the channel 116) configured to enable the cable 130 and connector 120 to couple to the portable radio 102 in the upward configuration.

In another implementation, the body 110 defines a channel 116 extending vertically in opposite directions from the connector receptacle 114 along the rear face 112 of the body 110, such that the channel 116 extends a length of the rear face 112 of the body 110. In this implementation, the channel 116 can accept the cable 130 in both an upward orientation and a downward orientation. For example, the body 110 can define a channel 116 including: a lower channel extending downward from the connector receptacle 114 toward a bottom edge of the rear face 112 of the body 110; and an upper channel extending upward from the connector receptacle 114 toward an upper edge, opposite the bottom edge, of the rear face 112 of the body 110. In this example, if a user wishes to wear the portable radio 102 with the cable 130 attached in the downward configuration, she may insert the connector 120 into the connector receptacle 114 and the cable 130 into the lower channel 116. If, later, the user wishes to switch the cable 130 from the downward configuration to the upward configuration, she may: remove the cable 130 from the lower channel 116 and the connector 120 from the connector receptacle 114; rotate the connector 120 180 degrees; and insert the connector 120 into the connector receptacle 114 and the cable 130 into the upper channel 116.

The channel 116 can define a depth such that channel 116 retains the cable 130 when inserted into the channel 116. In one implementation, the channel 116 can define a depth exceeding a threshold depth, such that a minimum portion of the cable 130 seats within the channel 116, below the rear face 112 of the body 110. For example, the channel 116 can define a depth exceeding a radius of the cable 130, such that a first volume of the cable 130 seated within the channel 116—below the rear face 112 of the body 110—exceeds a second volume of the cable 130 protruding outward from the channel 116 and the rear face 112 of the body 110. Therefore, by enabling a larger portion of the cable 130 (i.e., the first volume) to seat within the channel 116 with a smaller portion of the cable 130 (i.e., the second volume) protruding, the channel 116 can minimize lateral movement and/or rotation of the cable 130 relative the body 110, thereby minimizing movement of the connector 120 inserted into the connector receptacle 114 and coupled to the cable 130.

The channel 116 can define a particular shape such that channel 116 can accept the cable 130 and minimize rotation of the cable 130 within the channel 116. In one implementation, the channel 116 defines a semicircular cross-section such that walls of the channel 116 curve about a portion of the cable 130 when inserted in the channel 116. In this implementation, the channel 116 can define a radius greater than a radius of the cable 130, such that walls of the channel 116 do not pinch the cable 130. Additionally and/or alternatively, the channel 116 can define a radius less than a threshold radius (e.g., two millimeters greater than the radius of the cable 130) such that rotation of the cable 130 within the channel 116 is minimized. In another implementation, the channel 116 can define a rectangular (e.g., square) cross section defining a width greater than the radius of the cable 130. In this implementation, the width of this rectangular channel 116 can be configured to be slightly greater (e.g., within one millimeter) the radius of the cable 130. Therefore, the cable 130 can seat within the channel 116 while preventing compression and/or pressure in on the cable 130. Further, by including rectangular walls (e.g., perpendicular walls), the channel 116 can further limit rotation and/or movement of the cable 130 up the walls of the channel 116.

4.2.1 Undercut Sections

In one variation, the body 110 can include a set of undercut sections adjacent the channel 116 and configured to retain the cable 130 within the channel 116. In particular, the body 110 can include a set of undercut sections arranged adjacent and extending over each edge of the channel 116, such that a user may force a section of the cable 130 downward, past the set of undercut sections, to seat within the channel 116. Once the cable 130 is seated within the channel 116, the set of undercut section can prevent the cable 130 from slipping out of the channel 116.

For example, the body 110 can include set of undercut sections including: a first undercut section arranged on the rear face 112 of the body 110 adjacent and extending over a first edge of the channel 116; and a second undercut section arranged on the rear face 112 of the body 110 adjacent and extending over a second edge of the channel 116 opposite the first edge, the second undercut section aligned with the first undercut section along the length of the channel 116.

The first and second undercut sections can be arranged in a lower region of the portable radio 102 offset the connector receptacle 114 to enable retention of the cable 130 within the channel 116 along the length of the channel 116. A user may then insert the cable 130 into the channel 116 by exerting a force downward onto a section of the cable 130 over the first and second undercut sections, thereby enabling the cable 130 to force through these undercut sections and to seat within the channel 116. The first and second undercut sections—extending over each edge of the channel 116—can then cooperate to constrain lateral movement of the cable 130 outward from the channel 116. The user, however, may exert an upward force on the cable 130 to remove the cable 130 from the channel 116. Therefore, the first and second undercut section cooperate with the channel 116 and the cable 130 to prevent accidental movement of the cable 130 relative the channel 116 and/or body 110, while enabling the user to easily insert or clip the cable 130 into the channel 116 and/or remove the cable 130 from the channel 116.

In one implementation, the channel 116 defines a set of undercut sections extending along a length of the channel 116 and configured to accept and retain the channel 116 within the connector receptacle 114. In particular, in this implementation, the set of undercut sections (i.e., walls of the channel 116) can be configured to taper inward from a base surface of the channel 116 toward the rear face 112 of the body 110, such that a cross-section of the channel 116 forms a trapezoid (e.g., an isosceles trapezoid). Further, the channel 116 can define a depth greater than a radius of the cable 130, such that—when the cable 130 is inserted in the channel 116—the set of undercut sections taper inward over a widest cross-section of the cable 130 (e.g., defined by the radius), thereby constraining lateral movement of the cable 130 out of the channel 116.

For example, the channel 116 can define a first undercut section and a second undercut section, each undercut section forming a wall of the channel 116. The first and second undercut section can be configured to taper inward from the base surface of the channel 116—defining a first width greater than a radius of the cable 130—toward the rear face 112 of the body 110. The rear face 112 can define a gap between the first and second undercut section, defining a second width less than the radius of the cable 130, such that, at the rear face 112, the first and second undercut sections are inset the radius (e.g., the horizontal radius) of the sphere. Therefore, in this example, the first and second undercut sections can cooperate to prevent movement of the cable 130 relative the channel 116. However, a user may deliberately remove the cable 130 from the channel 116 by applying an upward force, exceeding a threshold force, on the cable 130. Similarly, the user may exert a force downward on the cable 130 into the first and second undercut sections to insert the cable 130 into the channel 116.

4.2.2 Transition Section

In one implementation, the channel 116 can include a transition section proximal an edge of the portable radio 102 configured to enable the cable 130 to move freely outside the channel 116 and thereby prevent pinching and/or damage to the cable 130. For example, the rear face 112 of the body 110 can define a flat section including the connector receptacle 114 and the channel 116 and a tapered section approaching a bottom edge of the portable radio 102 (e.g., curving inward toward the bottom edge of the portable radio 102). The transition section of the channel 116—corresponding to the tapered section of the rear face 112—however, can remain approximately parallel the rest of the channel 116, such that as the rear face 112 transitions from the flat section into the tapered section and toward the bottom edge of the portable radio 102, a depth of this transition section of the channel 116 decreases, thereby exposing (e.g., releasing) more of the cable 130 outside of the channel 116. In this example, as the tapered section approaches the bottom edge of the portable radio 102, the depth of the channel 116 will eventually be null at an end of the channel 116, thereby completely freeing the cable 130 from the channel 116. Therefore, by including this transition section of decreasing depth—rather than vertically extending the channel 116 across the rear face 112 of the portable radio 102 at a singular depth—the cable 130 can be gradually transitioned out of the channel 116, thus limiting pinch on the cable 130.

4.3 Clip Retention Features

In one implementation, the body 110 can include a set of clip retention features 118 configured to receive a clip 140 for mounting the portable radio 102 to a user (e.g., to an article of clothing worn by the user).

In one variation, the body 110 can include a set of undercut sections adjacent the connector receptacle 114 on the rear face of the body 110. The set of undercut sections can be configured to receive the clip 140 for coupling the clip 140 to the portable radio 102, such that the clip 140 seats over the connector receptacle 114. For example, the body 110 can include: a first undercut section extending adjacent a first edge of the connector receptacle 114 on the rear face 112 of the body 110; and a second undercut section, approximately parallel the first undercut section, extending adjacent a second edge, opposite the first edge, of the connector receptacle 114 on the rear face 112. The first and second undercut sections can be configured to mate with a corresponding first and second retention feature of the clip 140 to retain the clip 140 against the body 110.

In this example, the clip 140 can include a base section 142 defining: a first insert configured to mate with the first rail; and a second insert opposite the first rail on the base section 142 and configured to mate with the second rail. Therefore, a user may align the first and second inserts of the clip 140 with the first and second rails of the body 110 and push these inserts into the rails to attach the clip 140 to the body 110.

Additionally and/or alternatively, in another implementation, the body 110 can include a recess configured to receive the clip 140. For example, the body 110 can include a recess arranged in a bottom portion of the rear face 112 of the body 110 configured to accept and retain a distal end of the clip 140. This recess can intersect and extend outward (e.g., horizontally) from the channel 116 on each side of the channel 116, such that the distal end of the clip 140 seats over the channel 116 and/or the cable 130 within the channel 116.

5. Connector

The portable system can include a connector 120 coupled to a cable 130 configured to electronically couple the portable radio 102 to a secondary device (e.g., a legacy analog radio, a handheld microphone). The connector 120 can be configured to insert into the connector receptacle 114 to couple the cable 130 with the portable radio 102, as described above. In particular, the connector 120 can define an inner surface configured to seat against the base surface 115 of the connector receptacle 114 when the connector 120 is inserted into the connector receptacle 114.

The connector 120 can also include a signal converter configured to direct transfer of electrical signals between the portable radio 102 and the secondary device coupled to the cable 130. The connector 120 can be configured to include a signal converter matched to a particular type of secondary device coupled to the cable 130 opposite the portable radio 102.

Further, the connector 120 can be operable in a first orientation and a second orientation opposite the first orientation. In particular, the connector 120 can be configured to insert into the connector receptacle 114 in an upward orientation and a downward orientation while maintaining identical behaviors (e.g., functions) of the portable radio 102 in either orientation.

5.1 Connector Retention Features

The connector 120 can include a set of retention features configured to enable retention of the connector 120 within the connector receptacle 114 to minimize disturbances in electrical connectivity between the portable radio 102 and a corresponding secondary device coupled to the cable 130 opposite the portable radio 102.

In one implementation, the connector 120 can include a central cavity configured to receive and/or house a screw. The central cavity—and the screw housed within the central cavity—can be configured to align with the threaded section of the connector receptacle 114, when the connector 120 is inserted into the connector receptacle 114. A user may therefore tighten this screw—extending from the outer surface of the connector 120 and through the central cavity—into the threaded section of the connector receptacle 114 to more rigidly retain the connector 120 within the connector receptacle 114.

Alternatively, in another implementation, the portable radio system wo can include the clip 140 to support retention of the connector 120 within the connector receptacle 114. In this implementation, the clip 140 can be configured to seat over the connector 120 to prevent the connector 120 from rotating outward from the connector receptacle 114. For example, to secure the connector 120 within the connector receptacle 114, a user may: align the connector 120 within the connector receptacle 114; and attach the clip 140 over the connector receptacle 114 to compress the connector 120 into the connector receptacle 114. In this example, the clip 140 can be configured to attach to the body 110 of the portable radio 102 via a set of retention features integrated into the body 110 and configured to couple to a corresponding set of retention features integrated into the clip 140. Alternatively, in another example, the clip 140 can include a central cavity configured to align with a central cavity of the connector 120 and a threaded section of the connector receptacle 114. Therefore, in this example, a user may insert and tighten a screw—through the central cavity of the clip 140 and the central cavity of the connector 120—into the threaded section of the connector receptacle 114 to compress the clip 140 downward over the connector 120 and into the connector receptacle 114.

5.2 Electrical Signal Converter

The connector 120 can include a signal converter configured to communicate electrical information between the portable radio 102 and a secondary device coupled to the portable radio 102 via the connector 120 and the cable 130. The signal converter can be configured to convert electrical signals (e.g., digital signals, analog signals) received from the portable radio 102 in a first format to electrical signals in a second format that is readable by the secondary device. For example, the signal converter can be configured to transform a digital signal received from the portable radio 102 into an analog signal readable by the secondary device. Additionally and/or alternatively, the signal converter can be configured to transform an analog signal received from the secondary device into a digital signal readable by the portable radio 102. Further, the signal converter can be configured to reconfigure electrical controls (e.g., rules) based on a type of secondary device coupled to the portable radio 102 and an orientation the connector 120 within the connector receptacle 114.

In one implementation, the portable radio system 100 can include a suite of connectors, each connector 120 in the suite of connectors configured to couple the portable radio 102 with a particular type of secondary device.

For example, the portable radio system 100 can include: a first connector 120 configured to electronically couple the portable radio 102 to a legacy analog radio; and a second connector 120 configured to couple the portable radio 102 to a handheld microphone. The first connector 120 can include a first signal converter configured to transform a digital signal received from the portable radio 102 into an analog signal for passing to the legacy analog radio. The second connector 120, however, can include a second signal converter configured to enable transmission of a digital signal received from the portable radio 102 to the handheld microphone compatible with the digital signal.

In this implementation, each connector 120, in the suite of connectors 120, can be customized to be compatible with a particular type of secondary device. Therefore, if a user wishes to pair her portable radio 102 with multiple types of secondary devices, the user may acquire a set of connectors, from the suite of connectors 120, matched to the types of secondary devices the user plans to pair with her portable radio 102.

For example, the user may acquire a set of five connectors, each connector 120 including a unique signal converter matched to a particular type of secondary device. The user may remove a first connector 120 from the cable 130 to switch to a second connector 120 when switching from a first type of secondary device to a second type of secondary device. Therefore, in this example, the connector 120 can be removable from the cable 130 which can be compatible with multiple types of connectors. Alternatively, in another example, the user may acquire a set of five connectors including 5 connectors, each connector 120 including a unique signal converter, matched to a particular type of secondary device, and rigidly coupled to a cable 130. Therefore, in this example, the connector 120 can be fixed to the cable 130.

Alternatively, in another implementation, the portable radio system 100 can include a singular connector 120 that includes a signal converter including an array of electrical connections. In this implementation, the signal converter can be configured to: identify the type of secondary device coupled to the cable 130 opposite the connector 120; and enable and/or disable electrical connections within the array based on the type of secondary device.

For example, the connector 120 can include a signal converter including an array of electrical connections. At a first time, the signal converter can identify a first type of secondary device coupled to the connector 120. Based on the first type of secondary device, the signal converter can enable a first subset of electrical connections, in the array of electrical connections, and/or disable a second subset of electrical connections, in the array of electrical connections. At a later time, the signal converter can identify a second type of secondary device coupled to the connector 120. Based on the second type of secondary device, the signal converter can enable a third subset of electrical connections, in the array of electrical connections, and/or disable a fourth set of electrical connections, in the array of electrical connections. Therefore, the signal converter can identify the type of secondary device coupled to the portable radio 102 to reconfigure the array of electrical connections for processing electrical signals received from both the portable radio 102 and the secondary device.

The connector 120 can include a set of pin connectors configured to mate with a set of pad receivers arranged on the base surface 115 of the connector receptacle 114 for transferring electrical signals between the portable radio 102 and the secondary device. In one implementation, the connector 120 includes an array of pogo pins (e.g., spring-loaded electrical connectors) configured to mate with an array of pad receivers arranged within the connector receptacle 114.

Figure 6:
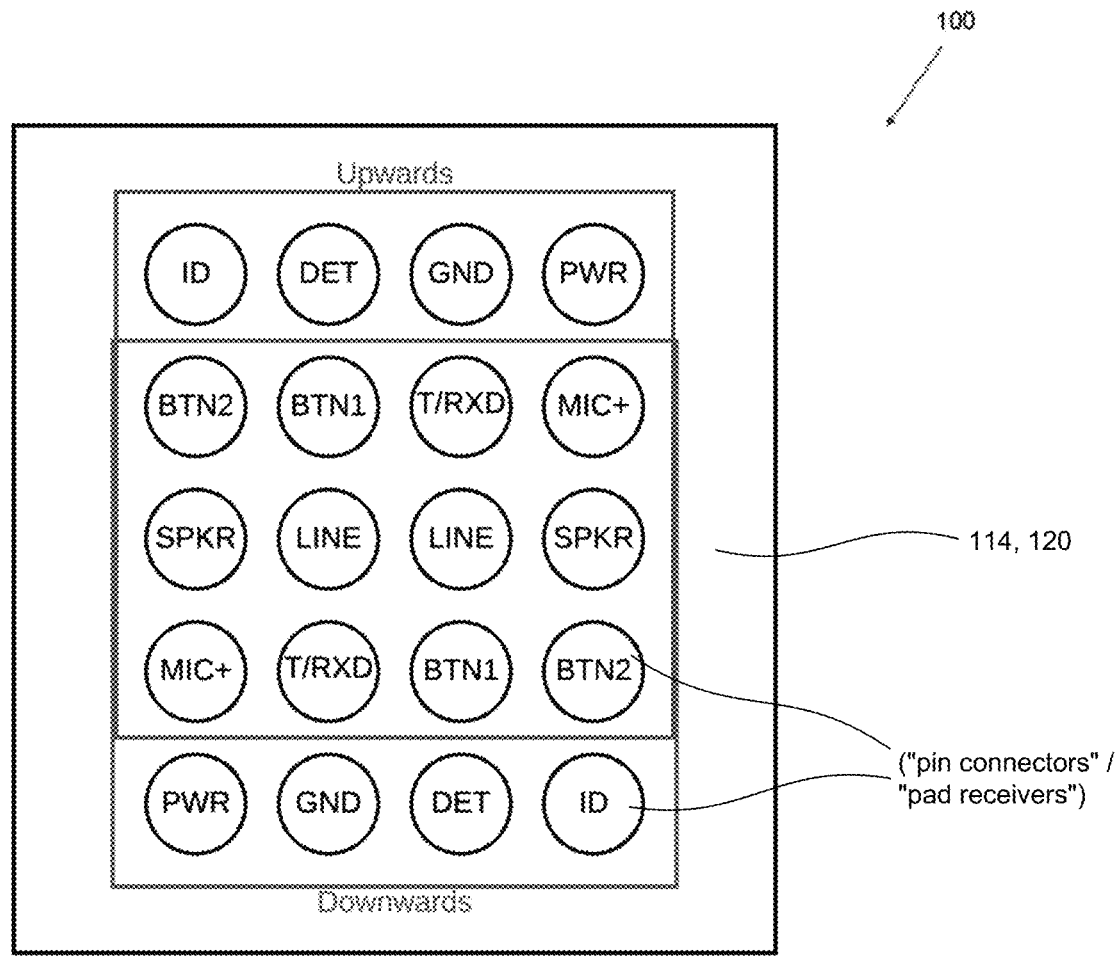
FIG. 6 is a schematic representation of the portable radio system.

In one implementation, as shown in FIG. 6, the set of pin connectors can include: a first set of pin connectors (or "ID" pin connectors) configured to detect a type of secondary device coupled to the cable 130; a second set of pin connectors (or "DET" pin connectors) configured to detect whether a secondary device is connected to the cable 130; a third set of pin connectors (or "GND" pin connectors) and a fourth set of pin connectors (or "PWR" pin connectors) configured to supply electrical power to the secondary device; and a fifth set of pin connectors (e.g., "BTN", "T/RXD", "Mic+", and/or "Spkr" pin connectors) configured to communicate analog and/or digital signals between the portable radio 102 and the secondary device.

5.3 Connector Orientation

The connector 120 can be configured to insert into the connector receptacle 114 in a downward orientation and an upward orientation. In the downward orientation, the connector 120 can be inserted into the connector receptacle 114 such that the cable 130 extends downward from the connector receptacle 114 toward a bottom edge of the rear face 112 of the body 110. Alternatively, in the upward orientation, the connector 120 can be inserted into the connector receptacle 114 such that the cable 130 extends upward from the connector receptacle 114 toward an upper edge of the rear face 112 of the body 110. The connector 120 can be configured (e.g., electronically) to enable identical functioning of the portable radio 102 in both the downward and upward orientations.

In one implementation, the connector 120 can be configured to rotate between the downward and upward orientations by rotating the connector 120 180 degrees within a plane defined by the connector 120. In this implementation, the connector 120 can include a set of pin connectors arranged on an inner surface of the connector 120 (e.g., facing the base surface 115 of the connector receptacle 114). The connector receptacle 114 can include a set of pad receivers configured to receive the set of pin connectors. The connector 120 can be configured such that: when inserted in the downward orientation, the set of pin connectors mate with a first subset of the pad receivers; and, when inserted in the upward orientation, the set of pin connectors mate with a second subset of the pad receivers. Further, the set of pin connectors on the connector 120 and the set of pad receivers within the connector receptacle 114 can be configured such that connector 120 exhibits identical behavior and/or functions regardless of whether the connector 120 is inserted in the downward orientation with the set of pin connectors coupled with the first subset of pad receivers or the upward orientation with the set of pin connectors coupled with the second subset of pad receivers.

The set of pin connectors can be configured to mirror the first subset of pad receivers when the connector 120 is facing the base surface 115 of the connector receptacle 114 in the downward orientation. Additionally, the set of pin connectors can be configured to mirror the second subset of pad receivers when the connector 120 is facing the base surface 115 of the connector receptacle 114 in the upward orientation. Thus, to enable identical functionality in both orientations, the set of pad receivers can be arranged in a first mirrored pattern, such that a 180-degree-rotation of the set of pad receivers yields the (identical) first mirrored pattern.

In one implementation, the connector 120 can be configured to include a base set of pin connectors and a primary set of pin connectors. The base set of pin connectors can be configured to couple to: a bottom base set of pad receivers when installed in the downward orientation; and an upper base set of pad receivers when installed in the upward orientation. The primary set of pin connectors can be configured to couple to a primary set of pad receivers, in both the downward and upward orientations, to communicate analog and/or digital signals between the portable radio 102 and the secondary device. Therefore, to enable identical functioning of the connector 120 in both the upward and downward orientation, the primary set of pin connectors can be arranged in a mirrored pattern (e.g., reflected across an x-axis and a y-axis of the connector 120) matched to a mirrored pattern of the primary set of pad receivers, such that in either orientation each pin connector, in the set of pin connectors, aligns with a pad receiver of a same type. Therefore, the primary set of pad receivers can also be arranged in a mirrored pattern.

For example, as shown in FIG. 6, the connector 120 can include a set of 16 pin connectors including: a base set of four pin connectors (e.g., a PWR pin connector; a GND pin connector, a DET pin connector, and an ID pin connector); and a set of twelve primary pin connectors (e.g., a set of BTN pin connectors, a set of LINE pin connectors, a set of T/RXD pin connectors, a set of MIC+ pin connectors, a set of SPKR pin connectors) arranged in a first pattern and configured to communicate analog and/or digital signals between the portable radio 102 and the secondary device and a set of 20 pad receivers. The connector 120 receptacle can include: a set of 20 pad receivers including: a bottom base set of four pad receivers (e.g., a PWR pad receiver, a GND pad receiver, a DET pad receiver, and an ID pad receiver); an upper base set of four pad receivers (e.g., a PWR pad receiver, a GND pad receiver, a DET pad receiver, and an ID pad receiver); and a set of twelve primary pad receivers (e.g., a set of BTN pad receivers, a set of LINE pad receivers, a set of T/RXD pad receivers, a set of MIC+ pad receivers, a set of SPKR pad receivers) arranged in a second pattern opposite the first pattern such that a corresponding pin connector aligns with a corresponding pad receiver when the set of pin connectors faces the set of pad receivers.

In this example, when the connector 120 is inserted in the downward orientation, the base set of four pin connectors can mate with the bottom base set of four pad receivers. Alternatively, when the connector 120 is inserted in the upward orientation, the base set of four pin connectors can mate with the upper base set of four pad receivers. The signal converter can be configured to detect whether the base set of four pin connectors are inserted into the bottom base set of four pad receivers or the upper base set of four pad receivers. Once the orientation of the connector 120 is identified, the signal converter can reconfigure functions of the set of primary pin connectors and the corresponding set of primary pad receivers accordingly, such that the connector 120 performs identical functions in either orientation.

As described above, in one implementation, the connector 120 can define an inner surface including the set of pin connectors and an outer surface, opposite the inner surface, having no electrical connections. In this implementation, the connector 120 can be rotated 180 degrees to switch between the upward and downward orientation, with the inner surface facing the base surface of the connector receptacle 114 in both orientations. Alternatively, in another implementation, the connector 120 can define the inner surface including a first set of pin connectors and the outer surface including a second set of pin connectors. In this implementation, to alternate between the upward and downward orientations, the connector 120 can be flipped such that the inner surface mates with the base surface of the connector receptacle 114 in a first orientation (e.g., the upward orientation) and the outer surface mates with the base surface of the connector receptacle 114 in a second orientation (e.g., the downward orientation). Additionally and/or alternatively, the connector 120 and/or the connector receptacle 114 can include a cover configured to guard pin connectors exposed (e.g., facing outwardly) within the connector receptacle 114.

6. Cable

The portable radio system 100 can include a cable 130 configured to electronically couple the portable radio 102 to a secondary device (e.g., a digital portable radio 102, an analog portable radio 102). The cable 130 can define: a first end coupled to the connector 120 and configured to couple to the portable radio 102; and a second end configured to couple to the secondary device.

The cable 130 can be configured to transiently seat within the channel 116 of the body 110. In particular, the cable 130 can include a first section 132 configured to seat within the channel 116 of the body 110 and a second section 134 configured to extend between the portable radio 102 and the secondary device, outside the channel 116. The first section 132 can define a first end coupled to portable radio 102 via the connector 120 while the second section 134 can define a second end coupled to the secondary device. The first section 132 and the second section 134 of the cable can be coextensive, such that these sections cooperate to form a single, continuous cable 130 configured to electronically couple the portable radio 102 to the secondary device.

In one implementation, the cable 130 includes a straight section 132 and coiled section 134. In this implementation, the straight section 132 can define a first length greater than a length of the channel 116 of the body 110, such that straight section 132 seats within the length of the channel 116. The coiled section 134 can define a second length, such that a sum of the first length of the straight section 132 and the second length of the straight section 132 yields a total length of the cable 130.

6.1 Cable Orientation

The cable 130—in conjunction with the connector 120—can be configured to operate in the upward orientation and the downward orientation opposite the upward orientation.

Generally, the user may insert the connector 120 into the connector receptacle 114 in either the upward orientation or the downward orientation in order to control orientation of the cable 130. For example, a user may attach the connector 120 to the connector receptacle 114 of the portable radio 102 in the upward orientation in order to route the cable 130 around a back of her neck and down toward her waist for coupling with a legacy analog radio attached to her belt. Alternatively, the user may attach the connector 120 to the connector receptacle 114 of the portable radio 102 in the downward orientation in order to route the cable 130 directly downward toward the legacy analog radio. In this example, the user may select to place the cable in either orientation based on which orientation the user finds more comfortable (e.g., to wear the cable).

In another example, the user may attach a handheld microphone to a lapel of her shirt and attach the portable radio 102 to her belt. The user may find that, in the downward orientation, the cable hangs too low or interferes with accessibility of the portable radio 102 (e.g., by stretching across a front surface of the portable radio 102). In this example, the user may wish to wear the cable in the upward orientation and therefore insert the connector in the upward orientation both for increased user comfort and improved functionality of the portable radio 102.

7. Clip

The portable radio system 100 can include a clip 140 configured to attach the portable radio 102 to a user. For example, a user may engage the clip 140 to attach the portable radio 102 to an article of clothing (e.g., a belt, a pocket, a lapel) worn by the user.

Generally, the clip 140 can include: a base section 142 coupled to the rear face 112 of the body 110; and a clamp section 144 pivotably coupled the base section 142 at a pivot section 146 defined by the clip 140. The clamp section 144 can be pivotably coupled to the base section 142 at the pivot section 146, such that the clip 140 can pivot between: a closed position in which a distal end of the clip 140— opposite the pivot section 146—seats at a first height relative the base section 142 of the clip; and an open position in which the distal end of the clip 140 seats at a second height greater than the first height relative the base section 142 of the clip 140.

The clip 140 can be configured to seat over the connector 120 and the cable 130 on the rear face 112 of the body 110 of the portable radio 102. The clip 140 can form a barrier between the user's body and the connector 120 and/or the cable 130 in order to prevent damage and or failure of the portable radio system 100. Further, the clip 140 can be configured to support the connector 120 and the cable 130 to prevent the connector 120 and/or cable 130 from falling out of the connector receptacle 114 and/or the channel 116 of the body 110.

In one implementation, the clip 140 can be configured to seat over the connector receptacle 114 to support retention of the connector 120 within the connector receptacle 114. For example, an inner surface of the clip 140 can be configured to fall within a threshold distance of the outer surface of the connector 120 such that clip 140 drives the connector 120 toward the base surface 115 of the connector receptacle 114. Alternatively, in another example, the inner surface of the clip 140 can include a spring configured to drive the connector 120 into the connector receptacle 114.

In this implementation, the clip 140 can be configured to extend over a length of the body 110 aligned with the cable 130. To support retention of the cable 130 within the channel 116, the inner surface of the clip 140 can define a relief configured to fit the cable 130 (e.g., a portion of the cable 130 protruding from the channel 116). For example, the relief can be contoured to a shape of the cable 130, such that a radius of the relief is slightly greater (e.g., within two millimeters) than a radius of the cable 130, to enable passage of the cable 130 through the relief—with minimal pinching of the cable 130—while constraining movement of the cable 130. Therefore, by including this relief on the inner surface, the clip 140 can fully close over the cable 130 to seat approximately flush the body 110.

The clip 140 can be configured to stabilize an orientation of the portable radio 102 when worn by a user. In the closed position, the clip 140 can be configured to minimize space between the portable radio 102 and a body of the user wearing the portable radio 102, such that the rear face 112 of the portable radio 102 rests within a threshold distance of the user's body along a length and width of the rear face 112. By minimizing this distance between the user's body and the rear face 112 at each point along the length of the rear face 112, the clip 140 can limit rotation of the portable radio 102 relative the user's body by maintaining the body 110 of the portable radio 102 approximately parallel and flush the user's body.

Further, the clip 140 can be located on the portable radio 102 in a particular position such that the pivot section 146—defined by an intersection of the clamp section 144 and the base section 142 of the clip 140—is located within a threshold distance (e.g., 0.25 inches, 0.5 inches) of a center of the connector 120 or the connector receptacle 114. By minimizing a distance between the pivot section 146 of the clip 140 and the center of the connector 120, the clip 140 minimizes a lever distance from the cable 130 to the pivot section 146, such that application of forces on the cable 130 (e.g., pulling on the cable 130) does not upset and/or apply a torque to the portable radio 102, thereby limiting rotation (e.g., twisting) of the portable radio 102 when worn by the user in either the upward orientation or the downward orientation.

7.1 Pivot

In one implementation, the clip 140 can include a discrete pivot (e.g., distinct from the base section 142 and clamp section 144) defining the pivot section 146, such that the base section 142 and the clamp section 144 are discrete sections coupled at the pivot section 146. For example, the clip 140 can include a steel pin defining the pivot section 146. In this example, the clip 140 can include the steel pin rigidly coupled to the base section 142 of the clip 140. The clamp section 144 can be pivotably coupled to the steel pin such that clamp section 144 can rotate about the steel pin, thereby enabling the clip 140 to switch between the open and closed positions. Therefore, in this example, by separating the clamp section 144 and the base section 142 into two distinct components and including this steel pin as the pivot, the portable radio system 100 can limit wear and tear on the clip 140 by eliminating bending of any singular component of the clip 140.

Alternatively, in another implementation, the clip 140 can define a living hinge defining the pivot section 146. In this implementation, the clip 140 can be configured such that the base section 142 and the clamp section 144 are coextensive, forming a singular cohesive structure. This singular cohesive structure (i.e., the clip 140) can be formed of a flexible material, such that the clamp section 144 can pivot between the open and closed positions at the pivot section 146, defined by a bend (e.g., exceeding ninety degrees) in the singular cohesive structure. For example, the clip 140 can formed of a flexible plastic. In this implementation, however, the clip 140 may experience increased stress at the pivot section 146 compared to a clip 140 including a discrete pivot (e.g., the steel pin), which may increase wear and tear on the clip 140 and/or increase risk of failure of the clip 140 at the pivot point over time.

7.2 Mounting the Clip

In one implementation, the clip 140 can be removable from the portable radio 102. As described above, the body 110 can include a set of clip retention features 118 configured to mount the clip 140 to the body 110.

In one implementation, the clip 140 can include a set of inserts extending from the base section 142 of the clip 140.

The set of inserts can be configured to couple to a set of undercut sections arranged adjacent the connector receptacle 114 on the rear face of the body 110. For example, the clip 140 can include a base section 142 including: a first insert configured to mate with a first undercut section of the body 110 adjacent a first edge of the connector receptacle 114; and a second insert opposite the first undercut section on the base section 142 and configured to mate with a second undercut section of the body 110 adjacent a second edge of the connector receptacle 114 opposite the first edge. Therefore, a user may align the first and second inserts of the clip 140 with the first and second undercut sections of the body 110 and push down to couple these inserts to the undercut sections, thereby mounting the clip 140 to the body 110.

Additionally and/or alternatively, in another implementation, the clip 140 can define a distal end configured to mate with a recess of the body 110 to retain the clip 140 in the closed position over the cable 130. In particular, the clip 140 can include the clamp section defining a distal end opposite the base section. The distal end can be configured to mate with a recess of the body 110, extending outward from the channel 116 in a bottom region of the rear face 112 of the body 110, such that the distal end of the clamp section seats into the recess and over the cable 130, thereby further retaining the cable 130 within the recess and stabilizing the clip 140 against the body 110.

In yet another implementation, the clip 140 can include a cavity configured to align with a central cavity of the connector 120 and a threaded section of the connector receptacle 114 to receive a screw for mounting both the clip 140 and the connector 120 to the body 110. In this implementation, a screw can be inserted through the cavity of the clip 140, through the central cavity of the connector 120, and into the threaded section of the connector receptacle 114 to mount the clip 140 to the connector 120 and the body 110.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or portable radio 102, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a signal converter but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A portable radio system comprising:
   a portable radio comprising:
      a wireless communication module configured to transmit and receive audio communications; and
      a body:
         comprising a connector receptacle arranged on a rear face of the body; and
         defining a channel extending from the connector receptacle along the rear face;
   a cable comprising:
      a first section configured to transiently seat within the channel; and
      a second section extending from the first section to a secondary device;
   a connector:
      coupled to the first section of the cable opposite the second section;
      configured to transiently seat within the connector receptacle to electronically couple the cable to the portable radio;
      operable in a downward orientation and an upward orientation;
   a clip comprising:
      a base section configured to transiently couple to the portable radio over the connector receptacle and the connector;
      a discrete pivot located within a threshold distance of a center of the connector receptacle; and
      a clamp section pivotably coupled to the base section at the discrete pivot and configured to attach the portable radio to a clothing surface.

2. The system of claim 1:
   wherein the connector comprises a first connector, in a set of connectors;
   wherein the first connector is configured to electrically couple the portable device to the secondary device comprising a legacy analog radio;
   wherein a second connector, in the set of connectors, is configured to electrically couple the portable device to a second secondary device comprising a handheld microphone.

3. The system of claim 1:
   wherein the first section of the cable comprises a straight section defining a first length greater than a second length of the channel; and
   wherein the second section of the cable comprises a coiled section.

4. The system of claim 1:
   wherein the connector is configured to transiently seat within the connector receptacle, with the first section of the cable transiently retained in the channel and with the second section of the cable extending downwardly from a bottom of the portable radio, to electronically couple the cable to the portable radio in the downward orientation; and
   wherein the connector is configured to transiently seat within the connector receptacle, with the first section of the cable extending upwardly from a top of the portable radio, to electronically couple the cable to the portable radio in the upward orientation.

5. The system of claim 1, wherein the discrete pivot of the clip is located within 0.5 inches of the center of the connector.

6. The system of claim 1:
   wherein the clamp section of the clip defines a distal end opposite the discrete pivot; and wherein the distal end comprises a relief configured to seat around and offset the cable in a closed position.

7. The system of claim 1:
wherein the connector receptacle comprises a set of pad receivers arranged on a base surface of the connector receptacle in a first pattern; and
wherein the connector comprises a set of pin connectors arranged on the connector in a second pattern corresponding to the first pattern and configured to couple to:
a first subset of pad receivers, in the set of pad receivers, in the downward orientation; and
a second subset of pad receivers, in the set of pad receivers, in the upward orientation.

8. The system of claim 7, wherein the set of pin connectors comprises:
a first power pin connector configured to couple to:
a first power pad connector in the downward orientation; and
a second power pad connector in the upward orientation, the second power pad connector opposite the first power pad connector in the first pattern;
a first analog pin connector configured to couple to:
a first analog pad connector in the downward orientation; and
a second analog pad connector in the upward orientation, the second analog pad connector opposite the first analog pad connector in the first pattern; and
a second analog pin connector opposite the first analog pin connector in the second pattern and configured to couple to:
the second analog pad connector in the downward orientation; and
the first analog pad connector in the upward orientation;
a first digital pin connector configured to couple to:
a first digital pad connector in the downward orientation; and
a second digital pad connector in the upward orientation, the second digital pad connector opposite the first digital pad connector in the first pattern; and
a second digital pin connector opposite the first digital pin connector in the second pattern and configured to couple to:
the second digital pad connector in the downward orientation; and
the first digital pad connector in the upward orientation.

9. The system of claim 1, further comprising a seal configured to abut surfaces of the connector to surfaces of the connector receptacle to stabilize the connector within the connector receptacle.

10. The system of claim 1, wherein the connector receptacle comprises a threaded section:
arranged on a base surface of the connector receptacle; and
configured to mate with a screw extending from the connector to retain the connector within the connector receptacle.

11. The system of claim 10:
wherein the base section of the clip is configured to seat above the connector to retain the connector within the connector receptacle; and
wherein the threaded section is configured to mate with the screw extending through the clip and the connector.

12. The system of claim 1:
wherein the channel comprises:
an upper channel extending upward from the connector receptacle toward a top edge of the rear face of the body; and
and a lower channel extending downward from the connector receptacle toward a bottom edge of the rear face of the body; and
wherein the first section of the cable is configured to seat within:
the upper channel in the upward orientation; and
the lower channel in the downward orientation.

13. A portable radio system comprising:
a portable radio:
configured to transmit and receive audio communication;
comprising a connector receptacle arranged on a rear face of the portable radio; and
defining a channel extending from the connector receptacle along the rear face;
a cable configured to electronically couple the portable radio to a secondary device and comprising:
a first section configured to transiently seat within the channel and defining a first length greater than a second length of the channel; and
a second section extending from the first section to the secondary device;
a connector:
coupled to the first section of the cable opposite the second section;
configured to transiently seat within the connector receptacle, with the first section of the cable transiently retained in the channel and with the second section of the cable extending downwardly from a bottom of the portable radio, to electronically couple the cable to the portable radio in a downward orientation; and
configured to transiently seat within the connector receptacle, with the first section of the cable extending upwardly from a top of the portable radio, to electronically couple the cable to the portable radio in an upward orientation;
a clip:
defining a pivot axis located within a threshold distance of a center of the connector receptacle;
comprising a base section configured to transiently couple to the portable radio over the connector receptacle and the connector; and
comprising a clamp section configured to pivot relative the base section about the pivot axis and to attach the portable radio to a user.

14. The system of claim 13:
wherein the clamp section of the clip is configured to pivot between a closed position and an open position;
wherein the base section of the clip is configured to retain the connector within the connector receptacle; and
wherein the clamp section of the clip is configured to retain the cable within channel in the closed position.

15. The system of claim 13, wherein the base section of the clip comprises a spring:
arranged on an inner face of the base section; and
configured to drive the connector into the connector receptacle.

16. The system of claim 13, wherein the clip comprises a living hinge between the base section and the clamp section.

17. A portable radio system comprising:
a portable radio comprising:
  a wireless communication module configured to transmit and receive audio communications; and
  a body:
    comprising a connector receptacle arranged on a rear face of the body and configured to transiently receive a connector to electrically couple the portable radio to a secondary device;
    defining a channel extending from the connector receptacle along the rear face and configured to transiently receive a cable extending from the connector; and
    comprising a set of clip retention features adjacent the connector receptacle; and
the clip comprising:
  a base section configured to transiently install on the rear face of the body, over the connector receptacle, via the set of clip retention features;
  a pivot section located within a threshold distance of a center of the connector receptacle; and
  a clamp section configured to pivot relative the base section at the pivot section from a closed position to an open position to transiently attach the portable radio to a surface.

18. The system of claim 17, further comprising:
the cable comprising:
  a first section configured to transiently seat within the channel; and
  a second section extending from the first section to a secondary device; and
the connector:
  coupled to the first section of the cable opposite the second section;
  configured to transiently seat within the connector receptacle, with the first section of the cable transiently retained in the channel and with the second section of the cable extending downwardly from a bottom of the portable radio, to electronically couple the cable to the portable radio in a downward orientation;
  configured to transiently seat within the connector receptacle, with the first section of the cable extending upwardly from a top of the portable radio, to electronically couple the cable to the portable radio in an upward orientation.

19. The system of claim 17, wherein the set of clip retention features comprises:
  a first undercut section arranged on the body adjacent a first edge of the connector receptacle and configured to mate with a first surface of the base section of the clip; and
  a second undercut section arranged on the body adjacent a second edge of the connector receptacle, the second edge opposite the first edge, and configured to mate with a first surface of the base section of the clip.

* * * * *